Dec. 9, 1958  R. A. RUSCETTA ET AL  2,863,811
METHOD OF ETCHING CAPACITOR ELECTRODES
Filed May 9, 1955
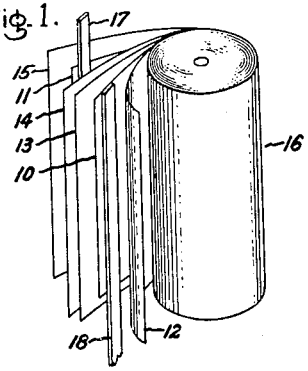
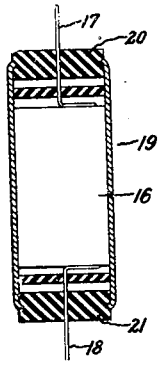
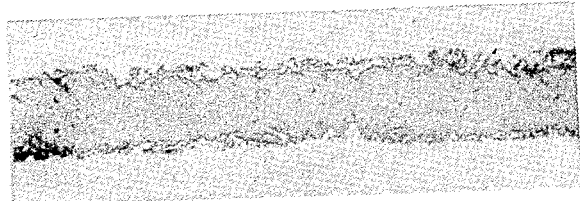
Inventors:
Ralph A. Ruscetta,
Alfred L. Jenny,
by  A. Cohen
Their Attorney United States Patent Office 2,863,811
Patented Dec. 9, 1958

2,863,811

METHOD OF ETCHING CAPACITOR ELECTRODES

Ralph A. Ruscetta and Alfred L. Jenny, Glens Falls, N. Y., assignors to General Electric Company, a corporation of New York Application May 9, 1955, Serial No. 507,010

15 Claims. (Cl. 204—141)

This invention relates to electrodes for electrolytic capacitors and the preparation thereof. More particularly it relates to a method of etching capacitor electrodes of various metals.

The present application is a continuation-in-part of our copending application Serial No. 236,128, filed July 11, 1951 (now abandoned), and assigned to the same assignee as the present invention, the latter application being a continuation-in-part of application Serial No. 181,998, filed August 29, 1950 (now abandoned), also assigned to the same assignee.

It is known that improvement may be effected in electrolytic capacitors by etching the surface of their electrodes or armatures. Etching materially increases the effective area of the surface of the electrodes and thereby correspondingly increases the electrical capacity per unit of projected electrode area or the capacity value for a given electrode size.

When compared with the various metals employed as electrodes in capacitors, the use of tantalum metal produces a device having more stable electrical characteristics and a longer life in relation to similar capacitors made with other metals such as aluminum, for example. Tantalum being an expensive metal, it is important that a maximum surface area per unit weight be obtained in order that the amount of tantalum metal per unit capacitance shall be a minimum. Unfortunately, however, tantalum is a very inert material and as a result known methods of etching metals, with the possible exception of one, have been wholly unsuccessful when applied to tantalum, resulting either in no attack at all or in a polishing action which, of course, may actually decrease the effective area of the original surface.

The one known method which has been found to etch tantalum to some degree is that described in Patents 2,052,962 and 2,080,390 to Booe as involving a combination chemical and galvanic action in which the metal to be etched is arranged to pass through an etching bath with its surfaces held in close contact with screens made from a metallic material preferably below the metal to be etched in the electromotive series. According to this method the etching bath is a water solution of hydrochloric acid, sulphuric acid, hydrofluoric acid, sodium hydroxide or the like such that the anion of the electrolyte forms soluble compounds with the metal being etched. Tests carried out on this method show that the etch ratio, which may be defined as the ratio of the effective surface area in an electrolytic capacitor to the projected area, the ratio of the total surface area after etching to the surface area before etching, or as the ratio of the capacitance etched to the capacitance unetched, of some metals such as aluminum may be increased to values ranging from 1.5 to possibly 3.4 or more. However, when tantalum was etched in accordance with this known method, it was found that the effective surface area could only be increased by 20%, i. e., to a maximum etch ratio of 1.2. In general, an etch ratio of at least 1.5 must be realized to justify the added cost of the etching process and in the case of tantalum is particularly desirable due to the higher cost of this metal in comparison with aluminum or the like.

While the present etching method and etching composition are particularly suitable for use with tantalum, the invention is not restricted to the etching of tantalum since other refractory, film-forming, chemically inert metals, namely, zirconium, niobium, alloys of tantalum and niobium, and titanium have also been found to be effectively etched with the present etching compositions in accordance with the invention to provide an etching ratio of at least 1.5.

It is therefore an object of this invention to provide etched capacitor electrodes having an etch ratio of at least 1.5.

It is also an object of this invention to provide improved capacitors employing etched electrodes having etch ratios ranging from at least 1.5 to 6.5 and above.

It is a further object of this invention to provide a method of etching refractory, film-forming metals such as tantalum, zirconium, niobium, alloys of tantalum and niobium, and titanium, whereby etch ratios equal to and above these values will be realized.

It is also an object of this invention to provide an electrolyte bath or solution for drastically etching the above metals.

Additional objects and features of the invention will become apparent from the following detailed description and with reference to the accompanying drawing in which Figs. 1 and 2 illustrate an electrolytic capacitor of a type in which the electrodes of the present invention can be used; Fig. 3 is an enlarged cross-sectional view of an unetched tantalum foil; Fig. 4 is an enlarged cross-sectional view of a tantalum foil etched by the known process described hereinbefore; and Fig. 5 is a similar view of a tantalum foil or electrode of the present invention.

While the following description deals mainly with tantalum, it is to be understood that the disclosed etching electrolytes produce similar results with respect to the other refractory metals mentioned, and that tantalum is used primarily as an example in describing the results obtained by the variation of the electrolyte components.

In accordance with our invention, the tantalum electrode material as the anode, and with stainless steel or any other suitable material as the cathode, is electrolytically etched in an electrolyte bath or solution comprising a solvent consisting essentially of at least 6.5% by weight of methanol and a trace of water, i. e., from about 3,000 to 135,000 parts by weight of water per million parts of solution, and at least one methanol-soluble inorganic salt dissolved therein. The preferred and the maximum water contents will depend on the particular salt or salts used. Preferably, the solvent consists entirely of methanol and a trace of water, but other inert organic liquids which are miscible with methanol may be employed in combination with methanol provided the solvent contains at least 6.5% by weight of methanol and a trace of water. Examples of such additional organic liquids are ethylene glycol, ethyl alcohol, isopropyl alcohol, nitrobenzene, glycerine, diethylene glycol, monoethyl ether and formamide.

As for the salt component of the bath, which may comprise one or more salts, it is essential that the salt or resultant solution be non-film forming, i. e., one which does not form a protective oxide or other film on the tantalum. It has been found that the inorganic methanol-soluble halides, and particularly the fluorides and bromides, are especially useful and the specific features of the invention will generally be described with reference thereto. Examples of suitable fluorides are ammonium fluoride, ammonium bifluoride, lead fluoride, calcium fluoride, sodium fluoride, copper fluoride and beryllium fluoride. Ammonium bromide is a preferred bromide. Examples of other salts which have been successfully employed are methanol-soluble chlorides, thiocyanates, nitrates, and chlorates, such as nickel chloride, ammonium thiocyanate, lithium chloride, cupric nitrate, potassium thiocyanate, potassium bromide, sodium iodide, and potassium chlorate. Either ammonium bromide, ammonium fluoride or ammonium bifluoride or a combination of the fluorides are preferred since the ammonium fluorides and bromides are quite soluble in methanol, ethylene glycol, glycerine, etc., and thus give electrolyte solutions of high conductivity with a low voltage drop across the electrolytic cell.

The compositions of various ammonium fluoride baths which have been successfully employed are tabulated in the following table in percent by weight.

| $NH_4F$ | $NH_4F \cdot HF$ | Methanol | Ethylene Glycol | Isopropyl Alcohol |
|---|---|---|---|---|
|  | 0.62 | 99.38 |  |  |
| 1.24 |  | 98.76 |  |  |
|  | 1.24 | 98.76 |  |  |
| 0.62 | 0.62 | 98.76 |  |  |
| 2.50 |  | 97.50 |  |  |
|  | 2.50 | 97.50 |  |  |
| 1.25 | 1.25 | 97.50 |  |  |
| 0.77 | 1.53 | 57.50 | 40.2 |  |
|  | 2.3 | 57.50 | 40.2 |  |
| 1.15 | 1.15 | 57.50 | 40.2 |  |
| 0.6 | 1.2 | 57.00 | 41.2 |  |
|  | 2.2 | 56.70 | 41.1 |  |
| 1.0 | 1.0 | 41.0 | 57.0 |  |
| 2.0 |  | 41.0 | 57.0 |  |
|  | 2.0 | 41.0 | 57.0 |  |
| 2.05 | 2.05 | 40.1 | 55.8 |  |
| 4.1 |  | 40.1 | 55.8 |  |
|  | 4.1 | 40.1 | 55.8 |  |
|  | 4.2 | 39.2 | 56.6 |  |
|  | 1.6 | 32.4 | 66.0 |  |
| 1.3 |  | 31.8 | 66.9 |  |
|  | 1.3 | 31.8 | 66.9 |  |
|  | 4.1 | 31.3 | 56.9 | 7.7 |
|  | 3.8 | 24.7 | 71.5 |  |
|  | 6.1 | 6.9 | 87.0 |  |
|  | 6.1 | 6.7 | 87.1 |  |
|  | 6.1 | 6.5 | 87.4 |  |

Each of the baths also contained a trace of water which is essential to obtain an etch ratio of at least 1.5 regardless of the solubility of the bromide, fluorides or other salts in the alcoholic or organic component of the bath. The required quantity of water has been found to be critical with the minimum being at least 3,000 parts per million parts by weight of solution and the maximum and the preferred quantities varying dependent upon the salt used and the thickness or gauge of the electrode being etched. When employing fluorides, the water is present in amounts within a total range of about 3,000 to about 14,000 parts per million by weight of the solution with a preferred minimum of at least 3,500 parts per million. With a 0.5 mil foil, we prefer from 3,500 to 4,500 p. p. m. in fluoride solutions, whereas with thicker foils, such as 1.5 mil, a preferred water content is from 7,000 to 9,000 p. p. m. With ammonium bromide solutions, up to about 135,000 p. p. m. water can be used, best results being obtained generally with from 6,000 to 130,000 p. p. m. water. Inasmuch as the rate of etching increases with increased water content for a given solution, and since an electrode of a given gauge would obviously be penetrated and the etch ratio thereby reduced faster than an electrode of heavier gauge under the same current and time conditions, it will be apparent that, in general, the thicker the electrode the more water is permissible within a definite critical range. While the water content is critical to obtain the desired etch, the presence or absence thereof or a variation of water content does not appear to materially change the specific conductivity of a given bath.

As a specific example of how the etch ratio is affected by water content of the electrolytes, samples of 1.6 mil thick tantalum electrodes having the same area were immersed as the anode in electrolytic solutions of ammonium fluoride and ammonium bifluoride in absolute methyl alcohol differing only as to their water content. The samples in each solution were subjected to a current of 0.2 ampere equivalent to a current density of 30 amperes per square foot for a period of ten minutes. The variations of etch ratio with water content of the solutions are tabulated below:

| Water, p. p. m.: | Etch ratio |
|---|---|
| 2,000 | 1.1 |
| 5,000 | 1.68 |
| 8,000 | 3.3 |
| 11,000 | 2.4 |
| 14,000 | 1.83 |
| 17,000 | 1.49 |

The effect of any particular water content will vary to some extent by varying the current density but, generally speaking, a satisfactory etch ratio within the contemplation of this invention may be realized by employing a current density within the total range of 5 to 50 amperes per square foot with a preferred range of 10–20 amperes per square foot at optimum water content.

With certain solutions, etch ratios of 6.5 or more have been obtained. One such solution contained, by weight, 58% methanol, 39.8% ethylene glycol, and 2.2% ammonium bifluoride plus about 4,200 p. p. m. water. At 20–25° C., this solution gave an etch ratio of 6.65.

As would be expected, an increase in temperature of the etching solution results in more active etching. Generally, however, the etching process may be satisfactorily carried out within the total range of 20–65° C. with preferred ranges within this total range dependent on the formation voltage contemplated for developing the dielectric film on the electrode surface after etching. For example, an etching temperature of from 20–35° C. is preferred when contemplating low formation voltage while a temperature range from 35–50° C. is preferred for high formation voltages. As would also be expected, the degree of etch will vary with the total time of treatment while the voltage required will vary with the specific conductivity or resistivity of the etching solution and the spacing between the anode and cathode.

As was pointed out hereinbefore, other fluorides soluble in the solvent mixtures consisting essentially of methanol and a trace of water can be substituted for the ammonium fluoride or fluorides. For example, etch ratios greater than 1.5 have been obtained by substituting for the ammonium fluorides other soluble inorganic fluorides such as sodium fluoride, lead fluoride, calcium fluoride, copper fluoride and beryllium fluoride. Specifically, using methanol plus about 3,000 to 5,000 parts per million water as the solvent, a saturated solution of cupric fluoride gave an etch ratio of 2.16, a solution of 7% beryllium fluoride gave an etch ratio of 2.84 and a solution of 1.24% sodium fluoride an etch ratio of 2.25. Similar solutions of 0.84% lead bifluoride and 9.25% calcium fluoride also gave etch ratios above 1.5, the calcium fluoride ratio being about 2.26.

As has been previously indicated, alcohol-soluble salts other than the fluorides can successfully be employed to etch tantalum to an etch ratio of at least 1.5 provided the proper quantity of water is present in the etching solution. In many cases the preferred and minimum amounts of water required to obtain the desired etch ratio are substantially increased when these other salts are substituted for the fluorides, as is shown by the following examples.

Solutions of ammonium bromide in methanol have been found to be much less critical than other salt solutions with regard to water content. The bromide permits a marked increase in allowable water content as compared with the fluorides or chlorides. For example, with a one mil foil, ammonium bromide solutions can contain from about 6,000 to 135,000 p. p. m. water. The details on the effect of the water additions on etch ratio for a one mil tantalum foil in an ammonium bromide-methanol solution containing 3.7%, by weight, ammonium bromide and 96.3% methanol are given below:

| Ml. water added per liter sol. | Water, p. p. m. | Etch Ratio | |
|---|---|---|---|
| | | at 75 Volts, D. C. | at 200 Volts D. C. |
| 0 | 1,000 | 1.17 | 1.17 |
| 10 | 13,000 | 4.42 | 3.10 |
| 20 | 25,000 | 3.72 | 2.67 |
| 30 | 37,000 | 3.70 | 2.66 |
| 40 | 49,000 | 2.90 | 2.13 |
| 50 | 61,000 | 3.14 | 2.28 |
| 70 | 85,000 | 2.32 | 1.73 |
| 90 | 109,000 | 2.19 | 1.66 |
| 110 | 133,000 | 2.14 | 1.45 |

It is apparent from these test results that the problem of carefully controlling the moisture content of the solution to obtain optimum results is not as great with the bromide as with the fluorides as very good results were obtained with water contents ranging from 10,000 to about 50,000 p. p. m. and good results above this range. Another advantage of bromide salts is the fact that a coarser etch is obtained which produces higher etch ratios at 200 volts formation and above.

Comparative tests made with a preferred ammonium bromide type electrolyte on the various refractory electrode metals mentioned above show that markedly increased surface area is obtained on all the specified metals, all producing an etch ratio of over 1.5. In these tests, the following electrolyte composition in percent by weight was used:

| | Percent |
|---|---|
| Methanol | 95.2 |
| Ammonium bromide | 3.6 |
| Anhydrous calcium chloride | 0.6 |
| Water | 0.6 |

The following table summarizes the results found in the comparative tests:

| Material Etched | Etch Time (Min.) | Etch Ratio |
|---|---|---|
| Ta | 6 | 2.40/1 |
| Zr | 6 | 1.70/1 |
| Nb | 6 | 1.61/1 |
| 75 Ta—25 Nb | 10 | 2.39/1 |
| 50 Ta—50 Nb | 10 | 1.72/1 |
| Ti | 15 | 2.50/1 |

In the above tests the etch ratio of the materials were obtained at 25° C. and 75 volts formation, except for that of titanium which was obtained at 9.5 volts.

While two particular tantalum-niobium alloys are shown in the above table, such alloys with relative proportions of tantalum and niobium different from those shown could also be effectively etched in accordance with the invention.

The effect of the concentration of ammonium bromide in methanol on the etch ratio of one mil tantalum foil is summarized in the following table:

| Percent NH₄Br | Weight CH₃OH | Etch Ratio at 75 Volts D. C. for Indicated Water Additions in Ml. per Liter | | | | | |
|---|---|---|---|---|---|---|---|
| | | 0 | 5.9 | 11.7 | 17.5 | 29 | 57.5 |
| .62 | 99.38 | 1.13 | 3.02 | 3.26 | 3.06 | 2.82 | 2.49 |
| 1.85 | 98.15 | 1.16 | 2.82 | 3.16 | 3.00 | 2.60 | 2.54 |
| 3.73 | 96.27 | 1.23 | 3.32 | 3.36 | 3.15 | 2.87 | 2.72 |
| 7.00 | 93.00 | 1.25 | 2.79 | 3.14 | 3.01 | 2.88 | 2.60 |

The solution comprising 3.73% NH₄Br balance methanol seems to be the best of the group, and there is no apparent gain from concentrating the solution with more NH₄Br.

The following tests appear to indicate that for best results, mixed solvents should not be used in the ammonium bromide solutions. For example, using a base solution of 56.0%, by weight, ethylene glycol, 40% methanol, and 4% ammonium bromide and a formation of 75 volts D. C., the following etch ratios were obtained.

| Water Added, Ml./Liter Sol. | Total Water, p. p. m. | 1 Mil Foil Etch Ratio at 75 Volts D. C. |
|---|---|---|
| 0 | 1,500 | 1.20 |
| 5 | 6,500 | 1.73 |
| 10 | 11,500 | 2.51 |
| 15 | 16,500 | 2.17 |
| 20 | 21,500 | 1.74 |

A comparison of these results with those given for the ammonium bromide-methanol solutions shows that the addition of ethylene glycol produces a solution which is not as good as straight methanol.

Another solution was prepared in which formamide was substituted for a portion of the methanol. This solution consisted of 56.9%, by weight, formamide, 40.1% methanol and 3% ammonium bromide. Etch ratios were obtained by formation to 75 volts D. C. and the effect of water additions to this solution may be seen in the chart below:

| Water Added, Ml./Liter | Total Water, p. p. m. | 1 Mil Foil Etch Ratio at 75 Volts D. C. |
|---|---|---|
| 0 | 2,000 | 1.11 |
| 5 | 7,000 | 1.18 |
| 10 | 12,000 | 2.08 |
| 15 | 17,000 | 2.58 |
| 20 | 22,000 | 2.36 |

Although formamide is a better additive than glycol, it is still inferior to straight methanol.

The following is an example of the use of a mixed fluoride-bromide bath consisting of 56%, by weight, ethylene glycol, 40% methanol, 3% ammonium bromide and 1% ammonium bifluoride. The effect of water additions of the etch ration of one mil tantalum treated in this solution is summarized in the table below:

| Water Added, Ml./Liter | Total Water, p. p. m. | 1 Mil Foil. Etch Ratio at 75 Volts D. C. |
|---|---|---|
| 0 | 2,000 | 1.17 |
| 2 | 4,000 | 1.60 |
| 4 | 6,000 | 1.30 |
| 6 | 8,000 | 1.34 |
| 8 | 10,000 | 1.35 |
| 10 | 12,000 | 1.96 |
| 15 | 17,000 | 1.63 |
| 20 | 22,000 | 1.69 |
| 35 | 37,000 | 1.39 |
| 50 | 52,000 | 1.02 |

While no apparent advantages are apparently derived by mixing fluorides and bromides, the following example indicates that very good results are obtained by the addition of a chloride, specifically calcium chloride to a bromide etching bath. The following table gives the results of tests at different voltages for a solution of 3.5%, by weight, ammonium bromide and 3.5% anhydrous calcium chloride in 93%, by weight, methanol.

| Ml. Water Per Liter Solution | | | | | | | Etch Ratio at— |
|---|---|---|---|---|---|---|---|
| 0 | 5.9 | 11.7 | 17.5 | 29 | 57.5 | 110 | |
| 1.15 | 1.84 | 3.04 | 3.14 | 3.68 | 3.60 | 3.16 | 75 Volts D. C. |
| 1.07 | 1.30 | 1.88 | 2.04 | 2.07 | 2.23 | 2.00 | 200 Volts D. C. |

The use of such mixtures of ammonium bromide and calcium chloride has a number of advantages. Both solid components are very soluble in methanol so that no heating is required. The highest etch ratios at highest water contents are obtained and the etch ratio is fairly constant over a wide water content range so that least control is required from a moisture content viewpoint. Furthermore, the each is course enough to give a 2:1 etch ratio at 200 volt formation.

A solution of 1:1 by volume methanol and ethylene glycol with 10 grams per liter lithium chloride was made up and various amounts of water added thereto. The weight composition of the base solution was:

| | Percent |
|---|---|
| Methanol | 41.4 |
| Ethylene glycol | 47.6 |
| Lithium chloride | 1.0 |

Water additions to the above solution had the following effect on the etch ratio:

| Water added (p. p. m.): | Etch ratio |
|---|---|
| 0 | 1.1 |
| 2,000 | 1.3 |
| 6,000 | 2.16 |
| 10,000 | 2.32 |

Another solution of 40.9% methanol (by weight), 57.1% ethylene glycol and 2.0% ammonium thiocyanate ($NH_4CNS$) gave the following results with water additions:

| Water added (p. p. m.): | Etch ratio |
|---|---|
| 0 | 1.15 |
| 2,000 | 1.16 |
| 4,000 | 1.35 |
| 6,000 | 1.71 |
| 8,000 | 1.66 |

A solution of 50 grams $NiCl_2 \cdot 6H_2O$ in 1 liter methanol, the weight composition of which is 94% methyl alcohol and 6% salt, was made up. The effect of water additions on the etch ratio of this solution, which already contained the water of hydration (about 22,000 p. p. m.) is indicated below:

| Water added (p. p. m.): | Etch ratio |
|---|---|
| 0 | 1.26 |
| 2,350 | 3.51 |
| 4,700 | 3.58 |
| 7,050 | 3.95 |
| 9,400 | 3.66 |
| 11,750 | 3.87 |
| 14,100 | 3.96 |
| 16,450 | 2.98 |
| 18,800 | 2.46 |

A solution which consisted of 4.5% by weight cupric nitrate and the balance (95.5%) methanol was tested as to the effect of water additions with the results shown below:

| Water added (p. p. m.): | Etch ratio |
|---|---|
| 0 | 1.90 |
| 2,200 | 1.78 |
| 4,400 | 1.54 |
| 6,600 | 1.04 |
| 8,800 | 1.04 |

In this test considerable water of hydration was also present in the solution as made so that the trend of etch ratio with further water additions is continuously downward.

Another solution was made up consisting of 96% by weight methanol and the balance (4%) anhydrous calcium chloride. The variation of etch ratio with water content is shown below:

| Water added (p. p. m.): | Etch ratio |
|---|---|
| 0 | 1.25 |
| 2,000 | 1.21 |
| 4,000 | 1.26 |
| 6,000 | 1.38 |
| 10,000 | 1.69 |
| 14,000 | 2.58 |
| 18,000 | 2.28 |
| 22,000 | 4.10 |
| 26,000 | 3.39 |
| 30,000 | 3.63 |

A solution of 96% methanol by weight and 4% potassium thiocyanate was tested with results indicated below:

| Water added (p. p. m.): | Etch ratio |
|---|---|
| 0 | 1.0 |
| 4,000 | 1.18 |
| 8,000 | 1.36 |
| 12,000 | 1.67 |

Solutions of potassium hydroxide, dibasic potassium phosphate, magnesium acetate, sodium hydrosulfide and cupric sulfate in methanol were also tested, but these were unsuccessful because of either incipient film formation or uncontrollable side reactions and salts or solutions having such undesirable properties are therefore excluded from the scope of the present invention. The uncontrollable side reactions referred to are those wherein certain of the undesirable substances produce on the metal a slime or sludge coating or film, as distinguished from an oxide film, which polarizes the etching reaction and sets up a chemical barrier between the solution and the metal which stops all etching.

It will be apparent that the conductivity of the etching solution and hence the time necessary for a given degree of etch will vary in accordance with the quantity of a given soluble salt in the solution. The present invention is not limited to any given concentration provided there is sufficient salt present to produce a conductive cell or, in other words, sufficient to pass current of the minimum density necessary to carry out the etch in a given time of treatment. The maximum quantity of salt which can be used is that providing a saturated solution thereof, and with such solutions a given degree of etch is obtained in a minimum length of time.

The results of the present invention are best illustrated by a comparison of Figs. 3–5 of the drawing. Fig. 3 illustrates a photomicrographic cross section of a one mil tantalum electrode before etching; Fig. 4 illustrates a photomicrographic cross section at the same degree of magnification of the same thickness tantalum electrode etched in accordance with the hereinbefore discussed prior art process involving the combination chemical and galvanic action and an electrolyte of hydrochloric, hydrofluoric or sulfuric acids, while Fig. 5 illustrates a photomicrographic cross section of the same thickness tantalum foil etched in accordance with the method of our invention. It will be observed that the degree of etch penetration in the case of the sample of Fig. 4 is hardly distinguishable when compared with the unetched sample of Fig. 3 while the degree of etch penetration in the case of Fig. 5 is clearly distinguishable in appearance from both the unetched Fig. 3 sample and the prior art etch sample of Fig. 4. This clear physical distinction in structure between our etched tantalum product and the Fig. 4 product is further evidenced by capacitance measurements on the two products which show the Fig. 4 sample to have an etch ratio of 1.04 while the Fig. 5 sample has a corresponding etch ratio of 2.80.

It will thus be apparent from the foregoing that we have effected by our invention an important advance in the art of etching tantalum metal whereby electrolytic capacitors may be provided which, because of the markedly increased surface area of the electrodes therein will have an exceptionally high capacitance compared to the volume occupied by the unit.

In Fig. 1 we have illustrated such a capacitor of the electrolytic type in which the numerals 10 and 11 indicate tantalum electrode strips etched in accordance with our invention, while the numerals 12, 13, 14 and 15 indicate alternately positioned spacing strips of paper or other porous insulating material all wound into a compact roll 16 suitable for impregnation with a suitable electrolyte before or after insertion into a casing or container, as is well known in the art. Terminals or tap straps 17 and 18 of opposite polarity are respectively fixed in contact with electrodes 10 and 11 and serve as terminals. Fig. 2 illustrates the rolled capacitor body 16 assembled in a case 19 with terminals 17 and 18 extending respectively through plugs or closures 20 and 21 of insulating material which serve to seal off the opposite ends of the casing 19.

Although we have described tantalum electrodes of our invention as having an etch ratio as high as 6.5, this is not necessarily a maximum value since there are indications that by optimum selection of the ratios of salt to the solvents disclosed, current densities, etc., this ratio may be increased in a manner which is still within the scope of the invention.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the foregoing disclosure.

What we claim as new and desire to secure by Letters Patent of the United States is:

1. The method of electrolytically etching tantalum which comprises making the tantalum the anode in an electrolyte solution consisting essentially of from 6.5 to 99% by weight of methanol, from about 87 to 0% by weight of an organic liquid miscible with methanol and from 3000 to 135,000 p. p. m. of water, and at least one methanol-soluble inorganic salt dissolved therein producing a solution having a conductivity capable of passing a current therethrough and being incapable of producing a film on the metal when current is passed through the electrolyte solution, said organic liquid forming with said methanol and water a combined solvent for said inorganic salt.

2. The method of electrolytically etching tantalum which comprises making the tantalum the anode in an electrolyte solution consisting essentially of at least 6.5% by weight of methanol, an organic solvent miscible with methanol, from 3000 to 135,000 p. p. m. of water, and a methanol-soluble inorganic halide dissolved therein, said organic solvent forming with said methanol and water a combined solvent capable of dissolving a sufficient amount of said halide to provide a solution having a conductivity capable of passing a current therethrough.

3. The method of electrolytically etching tantalum which comprises making the tantalum the anode in an electrolyte solution consisting essentially of at least 6.5% by weight of methanol, ethylene glycol, from 3000 to 135,000 p. p. m. of water, and a methanol-soluble inorganic fluoride dissolved therein, said ethylene glycol forming with said methanol and water a combined solvent capable of dissolving a sufficient amount of said fluoride to provide a solution having a conductivity capable of passing a current therethrough.

4. The method of electrolytically etching tantalum which comprises making the tantalum the anode in an electrolyte solution consisting essentially of at least 6.5% by weight of methanol, an organic solvent miscible with methanol, from 3000 to 135,000 p. p. m. of water, and an ammonium fluoride dissolved therein, said organic solvent forming with said methanol and water a combined solvent capable of dissolving a sufficient amount of said fluoride to provide a solution having a conductivity capable of passing a current therethrough.

5. The method of electrolytically etching tantalum which comprises making the tantalum the anode in an electrolyte bath consisting of from 3000 to 135,000 p. p. m. of water and a solution of ammonium fluoride and ammonium bifluoride in a mixture of ethylene glycol and at least 6.5% by weight of the solvent of methanol, said solution containing a sufficient amount of said fluorides to provide a bath having a conductivity capable of passing a current therethrough.

6. The method of electrolytically etching tantalum which comprises making the tantalum the anode in an electrolyte solution consisting of methanol, from 3000 to 135,000 p. p. m. of water, and sufficient of a methanol-soluble inorganic halide dissolved therein to provide a solution having a conductivity capable of passing a current therethrough.

7. The method of electrolytically etching tantalum which comprises making the tantalum the anode in an electrolyte solution consisting of methanol, from 3000 to 135,000 p. p. m. of water, and sufficient alkali halide dissolved therein to provide a solution having a conductivity capable of passing a current therethrough.

8. The method of electrolytically etching tantalum which comprises making the tantalum the anode in an electrolyte solution consisting of methanol, from 3000 to 135,000 p. p. m. of water, and sufficient nickel chloride dissolved therein to provide a solution having a conductivity capable of passing a current therethrough.

9. The method of electrolytically etching tantalum which comprises making the tantalum the anode in an electrolyte solution consisting of methanol, from 3000 to 135,000 p. p. m. of water, and sufficient calcium chloride dissolved therein to provide a solution having a conductivity capable of passing a current therethrough.

10. The method of electrolytically etching tantalum which comprises making the tantalum the anode in an electrolyte solution consisting of methanol, from 3000 to 135,000 p. p. m. of water, and sufficient calcium fluoride dissolved therein to provide a solution having a conductivity capable of passing a current therethrough.

11. The method of electrolytically etching tantalum which comprises making the tantalum the anode in an electrolyte solution comprising a solvent consisting of at least 6.5% by weight of methanol, from 3000 to 14,000 p. p. m. by weight of water, and the balance being an organic liquid miscible with methanol, and a sufficient amount of an ammonium fluoride dissolved therein to provide a solution having a conductivity capable of passing a current therethrough, said organic liquid forming with said methanol and water a combined solvent for said ammonium fluoride.

12. The method of electrolytically etching tantalum which comprises making the tantalum the anode in an electrolyte solution consisting of methanol, from 3,500 to 4,500 p. p. m. by weight of water, and a sufficient amount of an ammonium fluoride dissolved therein to provide a solution having a conductivity capable of passing a current therethrough.

13. The method of electrolytically etching tantalum which comprises making the tantalum the anode in an electrolyte solution consisting essentially of methanol, from 6000 to 135,000 p. p. m. of water and sufficient ammonium bromide dissolved therein to provide a solution having a conductivity capable of passing a current therethrough.

14. The method of electrolytically etching tantalum which comprises making the tantalum the anode in an electrolyte solution consisting of a solution of ammonium bromide and calcium chloride in a mixture of methanol and from 3000 to 135,000 p. p. m. of water.

15. The method of claim 14 in which the electrolyte consists by weight of a solution of about 3.5% calcium chloride, 3.5% ammonium bromide in methanol, said solution containing from about 5.9 to 135 milliliters water per liter solution.

References Cited in the file of this patent

UNITED STATES PATENTS

| | | |
|---|---|---|
| 2,209,712 | Brennan | July 30, 1940 |
| 2,218,076 | Werner | Oct. 15, 1940 |
| 2,336,846 | Clark | Dec. 14, 1943 |
| 2,368,688 | Taylor | Feb. 6, 1945 |
| 2,466,095 | Gall | Apr. 5, 1949 |

FOREIGN PATENTS

| | | |
|---|---|---|
| 691,509 | Great Britain | May 13, 1953 |